(12) United States Patent
Toepker

(10) Patent No.: US 9,132,471 B2
(45) Date of Patent: Sep. 15, 2015

(54) STRESS REDUCING INNER SLEEVE FOR TWIST BEAM AND ASSOCIATED METHOD

(75) Inventor: Dieter Toepker, Waterford, MI (US)

(73) Assignee: Magna International Inc., Aurora, Ontario (CA)

( * ) Notice: Subject to any disclaimer, the term of this patent is extended or adjusted under 35 U.S.C. 154(b) by 1090 days.

(21) Appl. No.: 13/112,087

(22) Filed: May 20, 2011

(65) Prior Publication Data

US 2011/0219602 A1 Sep. 15, 2011

Related U.S. Application Data

(62) Division of application No. 12/594,441, filed on Oct. 2, 2009, now Pat. No. 7,967,308.

(60) Provisional application No. 60/922,210, filed on Apr. 6, 2007.

(51) Int. Cl.
*B60G 21/00* (2006.01)
*B21D 53/88* (2006.01)
*B21D 39/04* (2006.01)
*B60G 21/05* (2006.01)

(52) U.S. Cl.
CPC ............. *B21D 53/88* (2013.01); *B21D 39/04* (2013.01); *B60G 21/051* (2013.01); *B60G 2200/21* (2013.01); *B60G 2206/202* (2013.01); *Y10T 29/49826* (2015.01)

(58) Field of Classification Search
CPC ...... B21D 53/88; B21D 39/04; B60G 21/051; B60G 2206/202; B60G 2200/21
USPC ............ 29/897.2, 890.036, 890.037, 890.04, 29/890.047, 890.053, 512, 516, 517, 523, 29/234, 235, 255, 263, 272, 280, 282, 29/889.61

See application file for complete search history.

(56) References Cited

U.S. PATENT DOCUMENTS

| | | | |
|---|---|---|---|
| 610,262 A | 9/1898 | Dikeman | |
| 2,595,695 A | 5/1952 | Packer et al. | |
| 2,742,946 A | 4/1956 | McGrann | |
| 3,688,521 A | 9/1972 | Smith et al. | |
| 3,777,343 A * | 12/1973 | D'Onofrio | 29/890.036 |
| 4,205,925 A | 6/1980 | Fisher | |
| 4,330,924 A * | 5/1982 | Kushner et al. | 29/458 |
| 5,409,254 A | 4/1995 | Minor et al. | |
| 5,484,174 A * | 1/1996 | Gotoh et al. | 285/382.2 |
| 5,762,352 A * | 6/1998 | Lee | 280/280 |
| 6,086,162 A * | 7/2000 | Pinch et al. | 301/124.1 |

(Continued)

FOREIGN PATENT DOCUMENTS

| EP | 0681932 B2 | 11/1995 |
|---|---|---|
| EP | 1314587 B1 | 5/2003 |

(Continued)

OTHER PUBLICATIONS

Defintion of Fasten and Fastening—Google.*

*Primary Examiner* — David Bryant
*Assistant Examiner* — Lee A Holly
(74) *Attorney, Agent, or Firm* — Dickinson Wright PLLC

(57) ABSTRACT

A method of manufacturing a twist beam axle assembly includes inserting a tubular sleeve within a twist tube, deforming a portion of the sleeve and the twist tube such that an outer surface of the sleeve engages an inner surface of the twist tube along at least a portion of the deformation, and fastening the sleeve to the twist tube.

14 Claims, 5 Drawing Sheets

(56) References Cited

U.S. PATENT DOCUMENTS

| | | | |
|---|---|---|---|
| 6,481,764 B1* | 11/2002 | Kwok | 285/382 |
| 6,510,763 B1 | 1/2003 | Streubel | |
| 6,869,091 B1 | 3/2005 | Anderson et al. | |
| 7,185,556 B2* | 3/2007 | Beattie | 74/586 |
| 7,257,982 B2* | 8/2007 | Park | 72/398 |
| 8,020,272 B2* | 9/2011 | Ghiran et al. | 29/421.1 |
| 2006/0059974 A1 | 3/2006 | Park | |
| 2007/0108714 A1 | 5/2007 | Kim et al. | |
| 2007/0271793 A1 | 11/2007 | Melles et al. | |

FOREIGN PATENT DOCUMENTS

| | | |
|---|---|---|
| EP | 1338447 B1 | 8/2003 |
| GB | 2069945 A | 9/1981 |

\* cited by examiner

STRESS REDUCING INNER SLEEVE FOR TWIST BEAM AND ASSOCIATED METHOD

This application is a Divisional Application of U.S. application Ser. No. 12/594,441 filed on Oct. 2, 2009 now U.S. Pat. No. 7,967,308 which claims the benefit of U.S. Provisional Application Ser. No. 60/922,210 filed on Apr. 6, 2007.

BACKGROUND

The disclosure relates generally to vehicle axles. More particularly, the present disclosure relates to a twist beam axle assembly having a reinforcement sleeve used to improve the stress gradient within the twist beam.

Twist beam axle assemblies typically function to transfer the vehicle load through rotatable wheels. The twist beam axle typically interconnects two suspension components such as trailing arms that not only rotatably support the wheels but also function to isolate one wheel of the vehicle from the opposite wheel. The suspension components may include body mounts, wheel spindles, torsion bars, shocks and springs. The twist beam axle may include trailing arms, spring mounts, shock mounts and spindle flanges, among others, to interconnect the various suspension components.

The twist beam axle assembly functions not only to transfer the vehicle load to the ground via the rotatable wheels but also provide desirable riding and handling characteristics as well as proper wheel tow and camber. Previously known twist beam axles typically include U-shaped or V-shaped beams oriented to be relatively rigid in bending but relatively compliant in torsion. These twist beam axles typically include many brackets at each end of the beam to couple the beam to trailing arms or other suspension components. Furthermore, typical twist beam axles provide a torsional stiffness of approximately 350 N-m/degree. While beams having this torsional stiffness have functioned, it may be desirable to provide an increased torsional stiffness of approximately 800-900 N-m/degree. Providing a twist beam axle with a relatively high torsional stiffness may present a challenge due to the local stresses introduced at the interconnection of the twist beam and the trailing arm. Accordingly, it may be beneficial to provide a twist beam axle assembly having a reinforcement sleeve to reduce the magnitude of local stresses found near the interconnection of the beam and the trailing arm.

SUMMARY

The present disclosure relates to a twist beam axle assembly including a twist tube and a tubular sleeve. The twist tube has a deformed portion with a non-circular cross-section positioned adjacent to an undeformed portion with a substantially circular cross-section. The tubular sleeve is positioned within and coupled to the twist beam to overlap the adjacent deformed and undeformed portions. An outer surface of the sleeve engages an inner surface of the twist tube.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
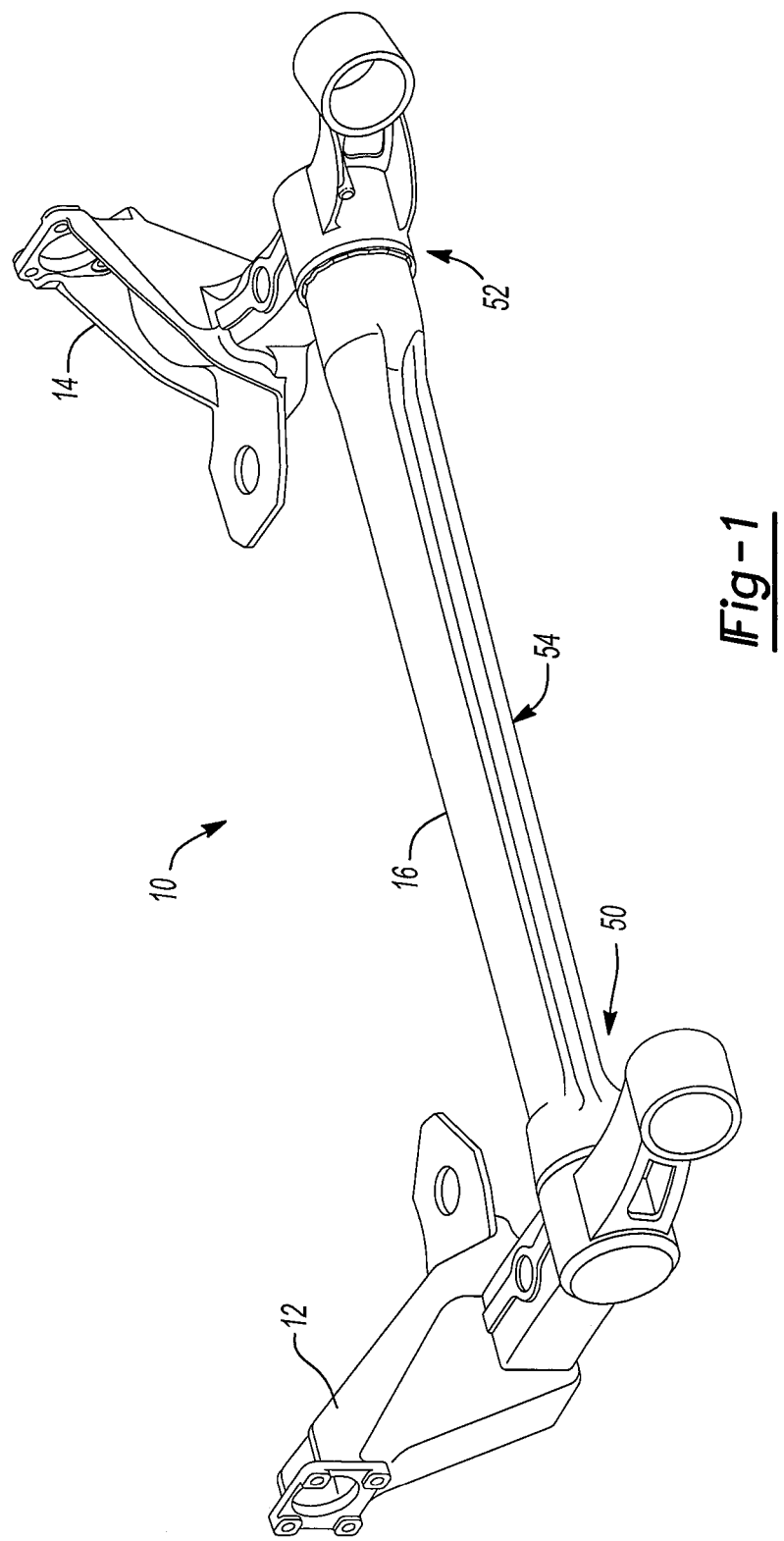
FIG. 1 is perspective view of a twist beam axle assembly according to the teachings of the present disclosure.

The following description is merely exemplary in nature and is not intended to limit the present disclosure, application, or uses. It should be understood that throughout the drawings, corresponding reference numerals indicate like or corresponding parts and features.

Figure 2:
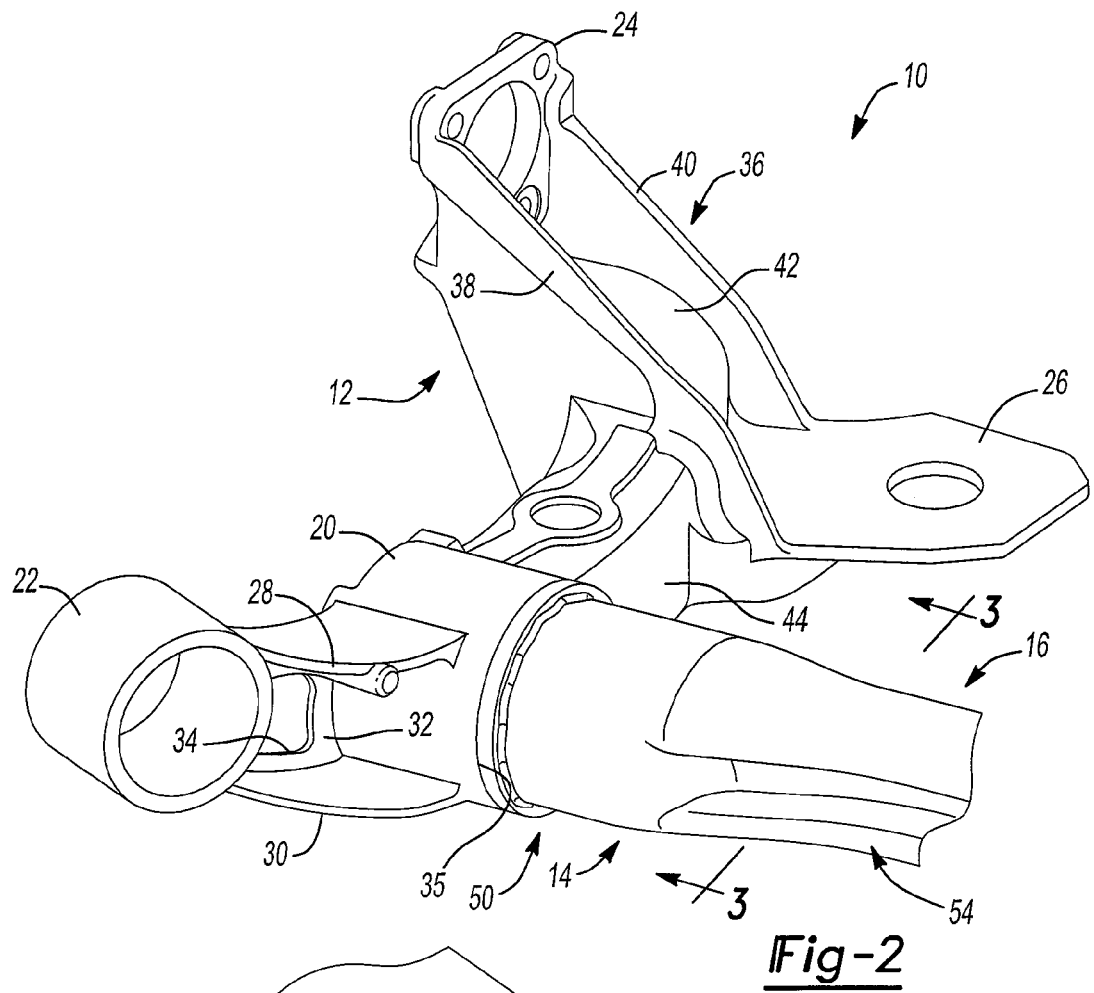
FIG. 2 is a fragmentary perspective view of the twist beam axle assembly shown in FIG. 1.

FIGS. 1 and 2 depict a twist beam axle assembly 10 having a first trailing arm 12, a second trailing arm 14 and a twist tube or beam 16 interconnecting the trailing arms 12,14. Trailing arms 12,14 may be constructed from a cast iron material. Beam 16 may be constructed from a high strength steel such as 22MnB5. Beam 16 may also be constructed from high strength steels including ferrite, bainite or martensite.

Trailing arm 12 is substantially a mirror image of trailing arm 14. As such, only trailing arm 12 will be described in detail. Trailing arm 12 includes a cylindrically shaped central boss 20, an end boss 22, a first flange 24 and a second flange 26. Central boss 20 and end boss 22 are interconnected by a first rib 28, a spaced apart and substantially parallel second rib 30 and a third rib 32. Third rib 32 interconnects first rib 28 and second rib 30. An aperture 34 extends through third rib 32 to reduce the weight of trailing arm 12. Central boss 20 terminates at a substantially planar face 35.

On the opposite end of trailing arm 12, first flange 24 and second flange 26 extend substantially perpendicular to one another. A bracket 36 supports first flange 24 and second flange 26. More particularly, bracket 36 includes first and second sidewalls 38,40 extending between first flange 24 and second flange 26. A center panel 42 interconnects first sidewall 38 and second sidewall 40.

A rail portion 44 interconnects first sidewall 38 and central boss 20. Due to the relatively complex geometry of trailing arm 12, it is beneficial to use a casting process to economically form this suspension component. Although not explicitly shown in the figures, it should be appreciated that trailing arm 12 is configured to connect to other vehicle components (not shown) at end boss 22, first flange 24 and second flange 26.

Figure 3:
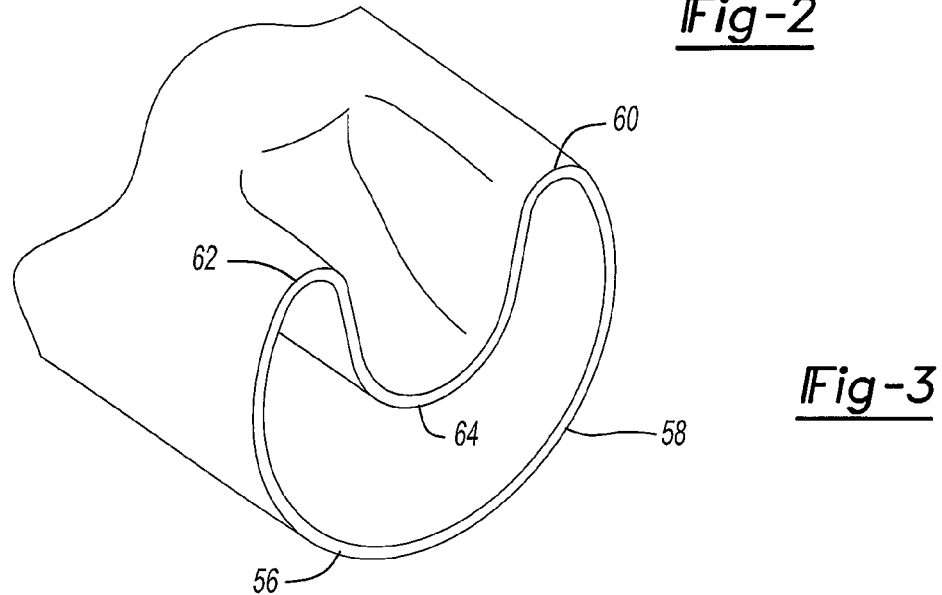
FIG. 3 is a cross-sectional view taken through a deformed portion of the twist beam axle assembly.

Beam 16 is formed from an elongated tube having a first end 50 fixed to trailing arm 12 at central boss 22. Beam 16 includes an opposite end 52 fixed to trailing arm 14. Beam 16 has a substantially circular cross-sectional shape at ends 50, 52. A deformed portion 54 extends between ends 50, 52. FIG. 3 is a cross-sectional view taken through deformed portion 54. Beam 16 is constructed from a material having a substantially constant thickness wall 56. Within deformed portion 54, wall 56 follows a convoluted path where a first segment 58 of wall 56 has a substantially semi-circular shape in cross-section. A second segment 60 and a third segment 62 are each shaped as lobes connected to opposite ends of first segment 58. A fourth segment 64 shaped as a trough interconnects second segment 60 and third segment 62. The overall cross-sectional shape of deformed portion 54 may be characterized as "U-shaped" or possibly "V-shaped." This cross-sectional shape provides relatively high bending strength while being relatively compliant in torsion.

Figure 4:
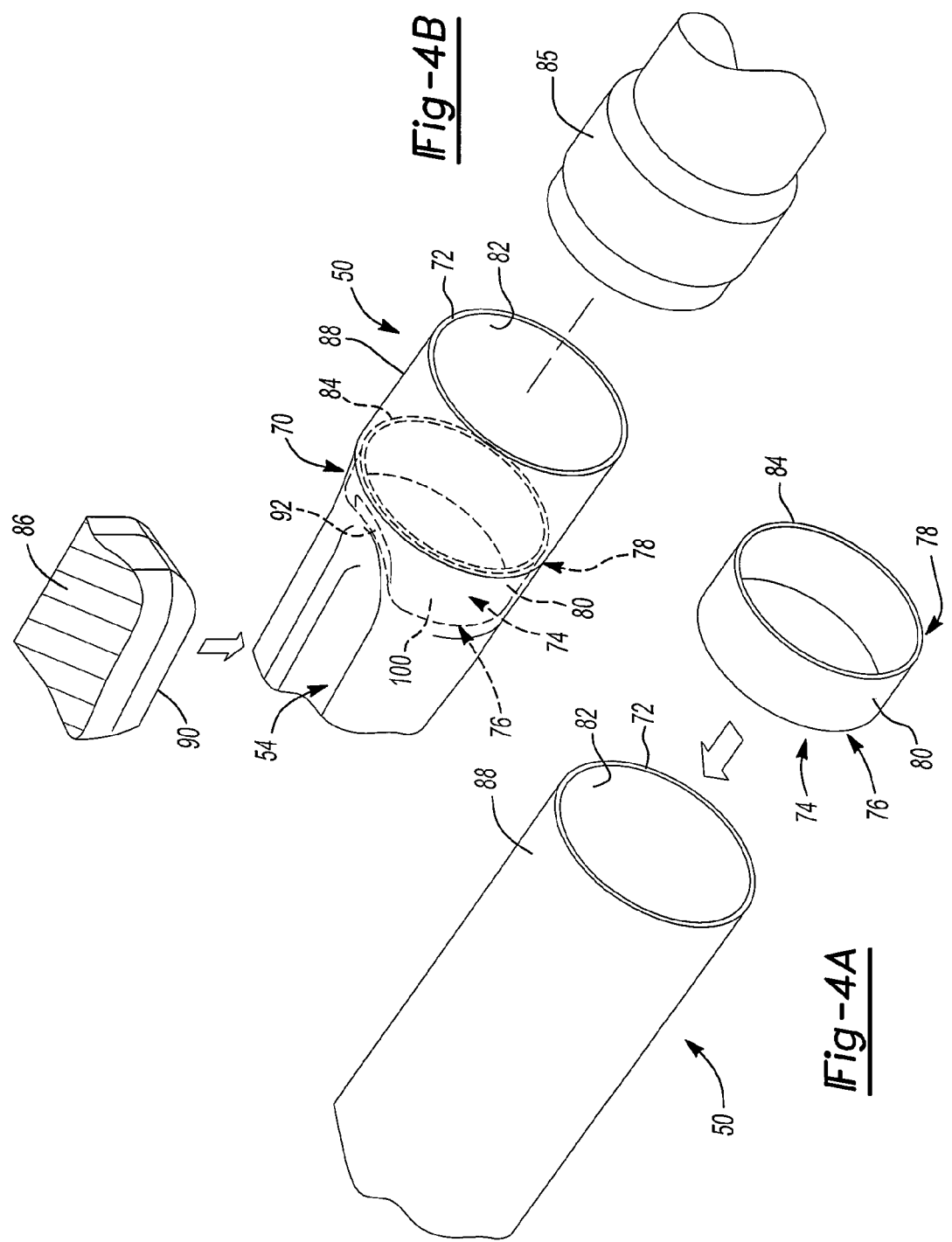
FIG. 4A is a perspective view of components of the twist beam axle assembly prior to deformation.
FIG. 4B is a fragmentary perspective view depicting deformation process.

FIG. 4 depicts a transition zone 70 where the deformed portion 54 transitions into undeformed substantially cylindrically shaped end 50. End 50 includes an end face 72 spaced apart from transition zone 70. End 50 is fixed to relatively rigid trailing arm 12. Within transition zone 70, the relatively stiff deformed portion 54 transitions to a cylindrical shape that is much more compliant in bending. Accordingly, a stress concentration may be produced within transition zone 70. To distribute stresses throughout beam 16, a reinforcement sleeve 74 is positioned within and coupled to beam 16 at transition zone 70.

A method of manufacturing twist beam axle assembly 10 will now be described. Beam 16 is initially formed as a tube having a substantially circular cross-section along its entire length. Reinforcement sleeve 74 is also formed as a tube having a substantially cylindrical cross-section along its entire length. In the embodiment presently described, sleeve 74 has an open first end 76 and an open second end 78. It is contemplated that twist beam axle assembly 10 includes a second reinforcement sleeve (not shown) positioned proximate trailing arm 14. Because the second reinforcement sleeve is formed and positioned in a substantially similar manner to reinforcement sleeve 74, only one reinforcement sleeve and beam interconnection will be described in detail.

Reinforcement sleeve 74 includes an outer cylindrical surface 80 defining an outer diameter slightly smaller than an inner diameter defined by an inner surface 82 of beam 16. Second end 78 of reinforcement sleeve 74 includes an end face 84 positioned within beam 16 substantially parallel to and axially offset from end face 72. A tool 85 maintains the axial position of reinforcement sleeve 74 relative to beam 16. While reinforcement sleeve 74 is being restricted from axial movement, a ram 86 is axially forced into contact with an outer surface 88 of beam 16. Ram 86 includes a die surface 90 shaped to define deformed portion 54. During translation of ram 86, beam 16 is deformed to have the cross-sectional shape previously discussed in relation to FIG. 3.

Ram 86 not only defines the shape of transition zone 70 but also deforms a portion 92 of reinforcement sleeve 74. During the time that the deformed portion 54 is created, inner surface 82 of beam 16 is forced into contact with outer surface 80 of reinforcement sleeve 74. Ram 86 continues to extend a predetermined distance to define a maximum depth of the trough formed at fourth segment 64. Subsequently, ram 86 is retracted from engagement with beam 16. At this time, reinforcement sleeve 74 includes an undeformed portion 100 having a substantially cylindrical cross-section at second end 78 and deformed portion 92 positioned at first end 76.

After ram 86 has been retracted, tool 85 restricting axial movement of reinforcement sleeve 74 may also be retracted. Deformed beam 16 and reinforcement sleeve 74 are interconnected to one another at this point in the process. However, an additional fastening process is envisioned. In one contemplated order of operation, beam 16 and reinforcement sleeve 74 are transferred as a subassembly to a fastening station. Alternatively, reinforcement sleeve 74 may be fastened to beam 16 at the same location where the deformation process is performed.

Reinforcement sleeve 74 may be fixed to beam 16 via a number of processes including riveting, adhesive bonding, screwing and welding. If adhesive bonding is utilized, the adhesive is placed at the interface between outer surface 80 and inner surface 82 prior to the deformation step. The other types of fixation would most likely be performed after the deformation step is completed.

Figure 5:
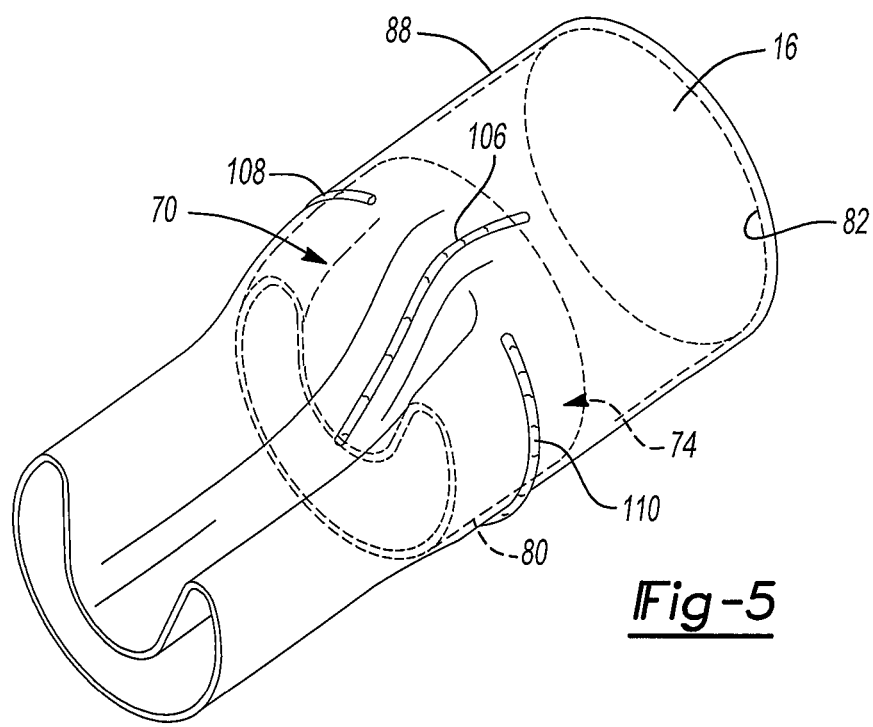
FIG. 5 is a fragmentary perspective view showing a welded interconnection between a reinforcement member and a beam.
Figure 6:
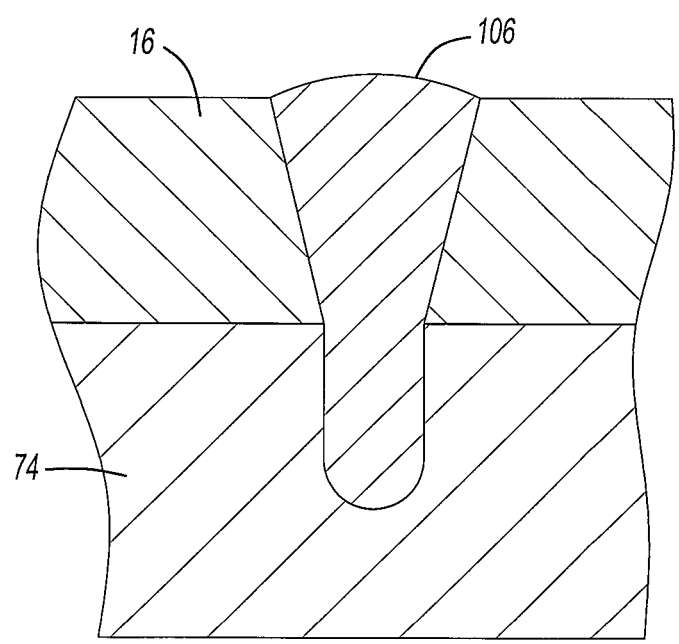
FIG. 6 is a cross-sectional view taken through a laser weld.

FIG. 5 depicts reinforcement sleeve 74 being fixed to beam 16 with a plurality of laser welds. A first laser weld 106 extends substantially longitudinally along outer surface 88 within transition zone 70. Second and third laser welds, 108, 110, extend circumferentially along outer surface 88. Welds 106, 108 and 110 are positioned at relatively low stress locations where outer surface 80 of reinforcement sleeve 74 engages inner surface 82 of beam 16. FIG. 6 depicts a cross-section of the laser weld connection between beam 16 and reinforcement sleeve 74. As shown, the laser weld penetrates both beam 16 and reinforcement sleeve 74.

Figure 7:
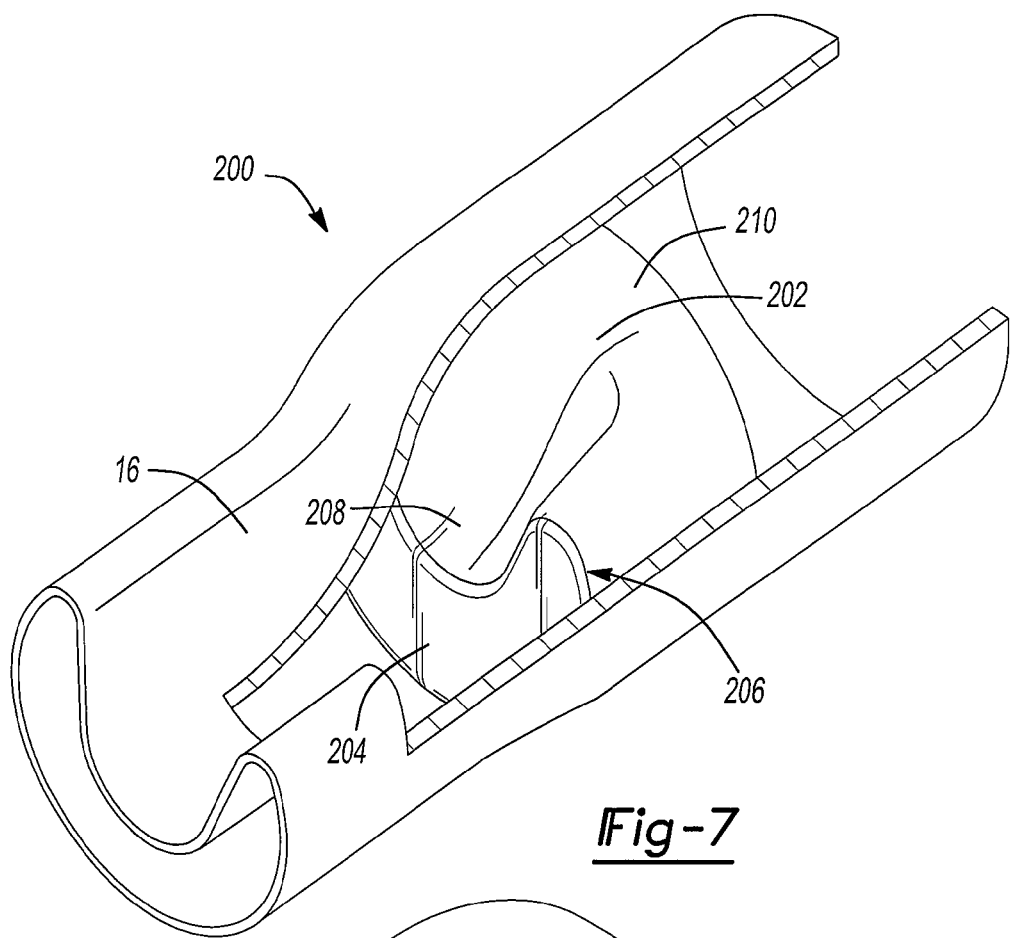
FIG. 7 is a fragmentary perspective view depicting a portion of another twist beam axle assembly.

FIG. 7 depicts a portion of another twist beam axle assembly 200. Twist beam axle assembly 200 is substantially similar to twist beam axle assembly 10. Accordingly, like elements will retain their previously introduced reference numerals. Twist beam axle assembly 200 includes a reinforcement cup 202 coupled to beam 16. Reinforcement cup 202 is substantially similar to reinforcement sleeve 74 except that reinforcement cup 202 includes a substantially planar wall 204 closing a first end 206 of reinforcement cup 202. In similar fashion to reinforcement sleeve 74, after deformation, reinforcement cup 202 includes a deformed portion 208 and an undeformed portion 210. Undeformed portion 210 includes a substantially circular cross-section. After deformation, reinforcement cup 202 may be fixed to beam 16 using any of the techniques previously described in relation to coupling reinforcement sleeve 74 with beam 16.

Figure 8:
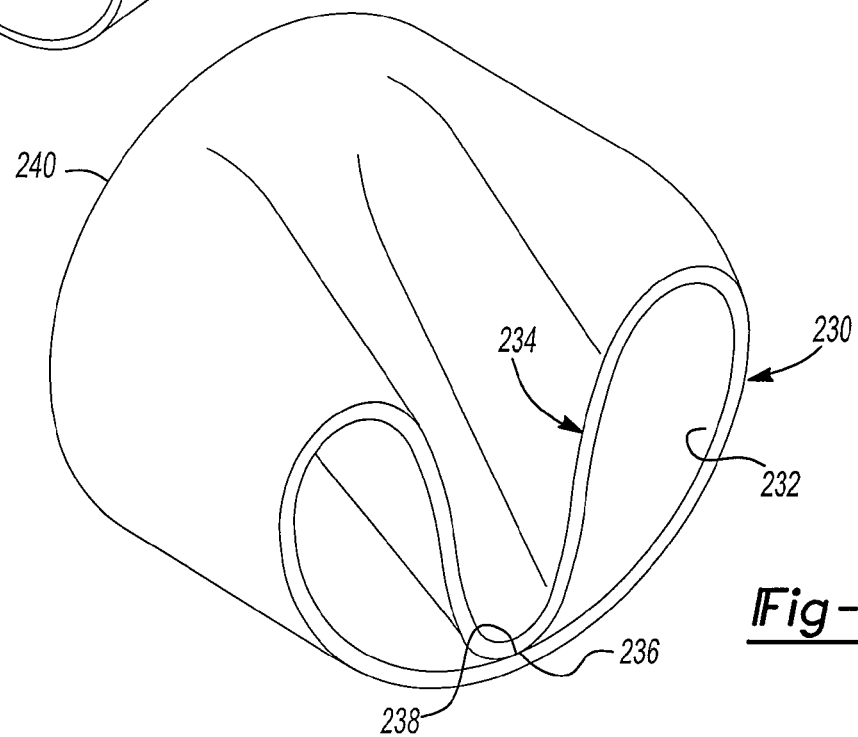
FIG. 8 is a perspective view of another reinforcement member for use with a twist beam axle assembly.

FIG. 8 represents another reinforcement member 230. Reinforcement member 230 may or may not have an end wall. Accordingly, reinforcement member 230 may be open at both ends or closed at one end and open at the opposite end. Reinforcement member 230 includes an inner surface 232. Reinforcement member 230 extends further into deformed portion 54 of beam 16 than reinforcement sleeve 74 or reinforcement cup 202. Based on the increased length of reinforcement member 230, a deformed portion 234 may include the cross-sectional shape shown in FIG. 8. In particular, a first portion 236 of inner surface 232 is forced into engagement with a second portion 238 of inner surface 232. An end 240 opposite deformed portion 234 extends into end 50 of beam 16 such that end 240 of reinforcement member 230 has a substantially circular cross-section.

Various beam and reinforcement member combinations have been discussed. It should be appreciated that other permutations of reinforcement member and beam features in addition to those explicitly discussed are contemplated as being within the scope of the present disclosure. Furthermore, while a rear axle twist beam interconnecting opposing trailing arms has been discussed, the present disclosure may relate to a number of other vehicle components including front axles, torsion bars and other suspension components. Similarly, the components connected to the ends of the twist beam may be formed from any number of processes including sheet metal forming, forging, casting, and may include materials such as aluminum, steel, and their alloys.

What is claimed is:

1. A method of manufacturing a twist beam axle assembly, comprising:
   inserting a tubular sleeve within a twist tube for a twist beam axle assembly;

deforming the twist tube to provide the twist tube with a longitudinally extending trough and wherein during the deformation a portion of the sleeve is also deformed such that an outer surface of the sleeve engages an inner surface of the twist tube along at least a portion of the deformation; and after the deforming step, fastening the sleeve to the twist tube as a separate and additional step from the deforming step to reinforce the connection between the twist tube and the sleeve.

2. The method of claim 1 wherein fastening includes at least one of laser welding, riveting, adhesive bonding and screwing the sleeve to the twist tube.

3. The method of claim 1 further including forming the sleeve to include a closed end to define a cup with a bottom.

4. The method of claim 3 further including positioning an open end of the cup proximate to a distal end of the twist tube.

5. The method of claim 4 wherein deforming includes deforming a shape of the bottom of the cup.

6. The method of claim 1 further including placing the sleeve on a mandrel and fixing the position of the sleeve relative to the twist tube with the mandrel during deforming.

7. The method of claim 6 further including removing the mandrel from the sleeve and the twist tube after deforming has been completed.

8. The method of claim 1 wherein deforming includes forcing one portion of an inner surface of the sleeve into contact with another portion of the inner surface of the sleeve.

9. The method of claim 1 wherein the sleeve and the twist tube have circular cross-sectional shapes prior to deforming.

10. The method of claim 9 wherein portions of the sleeve and the twist tube retain the circular cross-sectional shape after deforming.

11. The method of claim 1 further including offsetting an end of the sleeve inwardly from an end of the twist tube prior to deforming.

12. The method of claim 1 further including fixing one of first and second trailing arms to each end of the twist tube.

13. The method of claim 12 further including inserting a portion of the first trailing arm within the twist tube prior to fixing.

14. A method of manufacturing a twist beam axle assembly, comprising:

inserting a tubular sleeve within a twist tube for a twist beam axle assembly;

simultaneously deforming a portion of the twist tube and at least a portion of the sleeve to create a longitudinally extending trough in the twist tube and to engage an outer surface of the sleeve with an inner surface of the twist tube along at least a portion of the transition zone; and fastening the sleeve to the twist tube as an additional and separate step from the step of simultaneously deforming a portion of the twist tube and at least a portion of the sleeve.

* * * * *